UNITED STATES PATENT OFFICE.

MARIE R. WEABER AND HERMANN CLEMENS, OF EL PASO, TEXAS, ASSIGNORS OF ONE-HALF TO OTTO WEYDEMEYER, OF EL PASO, TEXAS.

PUNCTURE-HEALING COMPOSITION.

1,299,273.  Specification of Letters Patent.  Patented Apr. 1, 1919.

No Drawing.  Application filed July 13, 1918. Serial No. 244,812.

*To all whom it may concern:*

Be it known that we, MARIE R. WEABER and HERMANN CLEMENS, a citizen of the United States and subject of the Emperor of Germany, respectively, residing at El Paso, in the county of El Paso and State of Texas, have invented certain new and useful Improvements in Puncture-Healing Compositions, of which the following is a specification.

This invention relates to improvements in puncture healing compounds and it is the principal object of the invention to provide a compound adapted to be injected or otherwise introduced into the tubes or other air chambers or compartments of pneumatic tires whereby to effect the closing or healing of all punctures or similar ruptures occurring therein in an effectual and rapid manner and without deteriorating the rubber or fabric of the tire construction in any way.

Other objects will be in part obvious and in part pointed out hereinafter.

The invention consists, furthermore, in the novel ingredients employed as well as the combinations thereof, all of which will be more fully described in the following specification, and then finally embodied in the clauses of the claim which are appended to this specification and which form an essential part of the same.

The puncture healing compound forming our invention is adapted to be injected or otherwise introduced into the ordinary inner tube or other air compartment or chamber of a pneumatic tire and when arranged therein will move over and about the tube during rotation of the tire, thus engaging all surfaces of the same and rendering the healing or closing of punctures or other ruptures occurring therein possible.

One embodiment of the compound is herein offered for the purpose of illustration:

Beeswax_____ 1 ounce.
Paraffin_____ 2 ounces.
Rosin_____ 2½ ounces.
Linseed oil_____ 2 drams.

The above ingredients are mixed and heated to cause the melting of the same, whereupon two ounces of finely ground cork or similar matter is placed therein and obviously will absorb the same. At this time, the mixture is permitted to cool and then has two ounces of asbestos added thereto to maintain the same in an even and smooth state, thus preventing the lumping of the same when packaged or when placed in the tubes of air compartments of a pneumatic tire.

In using the improved compound, as hereinbefore stated, the same is placed in the inner tube or air compartment of a pneumatic tire by way of the valve stem thereof; one pint of the same being preferably or otherwise introduced. Approximately one-half pint of water is then injected or otherwise introduced into the tube or air compartment of the pneumatic tire and while the same will not mix with the puncture healing compound, it is obvious that it will serve as a vehicle therefor, hence, permitting the compound to be moved about and through the tube into engagement with all exposed surfaces thereof, thereby insuring the healing or closing of punctures occurring therein. Furthermore, it will be readily understood that the addition of water will also serve to maintain the compound cool.

We of course desire to have it understood that if desired, a greater or less quantity of the compound can be injected or otherwise introduced into the inner tube or air compartment of a pneumatic tire, this depending, of course, upon the size of the tire or tube.

From the above, it will be appreciated by persons skilled in the art that we have provided an exceedingly simple and effective form of puncture healing compound; the beeswax, paraffin and rosin serving as an effectual binding and healing agent therefor as well as a water proofing for the cork capable of entering the smallest crevices or punctures occurring in the tube or tire so treated, while the linseed oil serves as an efficient form of solvent, while the ground cork serves as an efficient form of filler capable of entering the punctures and closing the same upon the passage of the beeswax, paraffin, rosin and linseed oil thereinto. As hereinbefore stated, the disintegrated asbestos serves to prevent the lumping of the compound when packaged or when arranged in a tire tube or other air compartment thereof.

We claim:

1. A puncture healing compound including wax, rosin, oil, ground cork, and a substance to prevent lumping thereof.

2. A puncture healing compound including wax, rosin, oil, ground cork, and disintegrated asbestos.

3. A puncture healing compound including beeswax, paraffin, rosin, linseed oil, finely ground cork, and disintegrated asbestos.

4. A puncture healing compound including beeswax 1 ounce, paraffin 2 ounces, rosin 2½ onces, linseed oil ½ ounce, ground cork 2 ounces and disintegrated asbestos 2 ounces.

In testimony whereof, we affix our signatures hereto.

MARIE R. WEABER.
HERMANN CLEMENS.